No. 635,113. Patented Oct. 17, 1899.
W. M. WHEILDON.
FEEDING DEVICE FOR PULVERIZERS.
(Application filed Dec. 9, 1898.)
(No Model.)
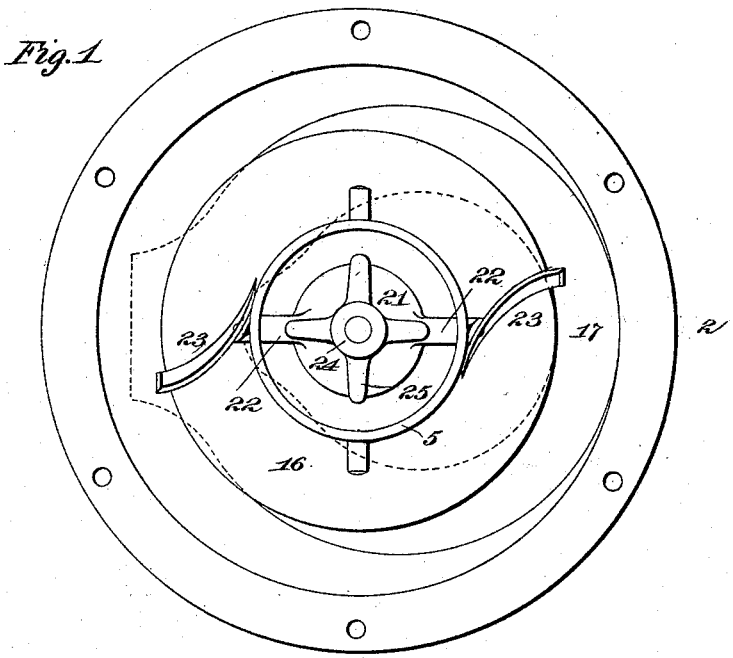
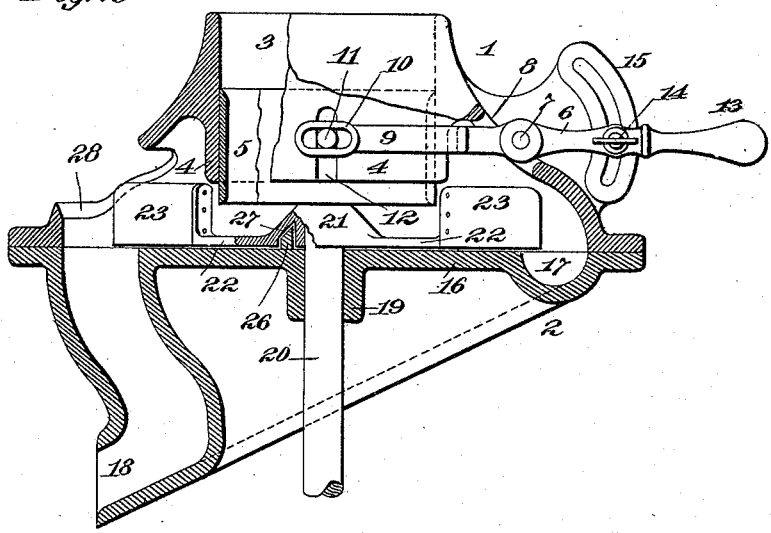
Witnesses:
Inventor
William M. Wheildon

United States Patent Office.

WILLIAM MAXWELL WHEILDON, OF BOSTON, MASSACHUSETTS, ASSIGNOR TO THE AERO-PULVERIZER COMPANY, OF JERSEY CITY, NEW JERSEY.

FEEDING DEVICE FOR PULVERIZERS.

SPECIFICATION forming part of Letters Patent No. 635,113, dated October 17, 1899.

Application filed December 9, 1898. Serial No. 698,717. (No model.)

*To all whom it may concern:*

Be it known that I, WILLIAM MAXWELL WHEILDON, a citizen of the United States, residing at Boston, in the county of Suffolk and State of Massachusetts, have invented a certain new and useful Improvement in Feeding Devices for Pulverizers and Similar Apparatus, (Case C,) of which the following is a specification.

My invention relates to various new and useful improvements in feeding devices, especially adapted for use in connection with pulverizing apparatus designed for the reduction to an impalpable powder of any pulverizable material, such as coal, coke, cement, sugar, graphite, drugs, gypsum, plaster, talc, slag, spices, grains, fertilizers, chalks, paint-stuffs, foundry-facings, &c.

The particular purpose for which my improved feeding device is used is in connection with a pulverizer for pulverizing coal to an impalpable powder which is blown into the fire-box of a boiler. In an application filed on even date herewith (Case B) I describe an improved feeding device for this purpose wherein a feed-chamber is employed having an opening at its upper end through which the material is introduced and having a rotatable table within said chamber, mechanism being provided for varying the distance between said table and feed-opening, whereby the thickness of material accumulating on the table may be adjusted. In the specific form of mechanism described in said application the rotatable table is adjustable relatively to the feed-opening. In some instances it may be desirable to maintain the table in a fixed plane and to adjust the feed-opening toward and away from said table. This allows for a very simple and effective construction. In said application I also illustrate in connection with the rotatable table a relatively stationary shear adapted to sweep off from the table the material accumulated thereon. In some instances it may be desirable to provide a non-rotatable table and to employ a rotating shear or shears for forcing material off of the table, the shear or shears moving over the upper surface thereof. In my present form of feed device I employ a table mounted in a feed-chamber having a feed-opening at its upper end through which material is introduced, and I adjust the feed-opening relatively to said table, whereby the thickness of material deposited on the table may be adjusted. Specifically considered, I employ at the upper end of the feed-chamber a vertically-adjustable collar or neck forming a part of the feed-opening. In my present invention I also employ a non-rotatable table comprising, essentially, a stationary circular platform, and I rotate with respect to said table one or more shears which sweep the material off of the table and deposit it in a suitable feed-chute. It will be understood that both of these features of invention may be employed in a single structure or that one alone of such features may be so employed—that is to say, it will be possible, and, in some instances, desirable, to make use of a rotatable table and a stationary shear, with the vertically-adjustable collar to regulate the feed-supply, and, in other instances, it may be desirable to employ a stationary table and a movable shear or shears, with any other desired form of adjusting mechanism for varying the feed-supply.

In order that my invention may be better understood, attention is directed to the accompanying drawings, forming a part of this specification, and in which—

Figure 1 is an interior plan view with the upper section of the casing removed, and Fig. 2 a vertical section illustrating a part of the neck and adjusting-sleeve in elevation.

In both of the above views corresponding parts are represented by the same numerals of reference.

The body of the feed device is composed, essentially, of two parts or casings—an upper portion 1 and a lower portion 2—bolted together at the center on a horizontal line. The section 1 is provided with a feed-opening 3 at its upper end, in which material is introduced in any suitable way—as, for example, from a hopper. This feed-opening extends within the interior of the feed-chamber and constitutes a cylindrical neck 4, located concentrically of said chamber. Mounted within the neck 4 is an adjusting or regulating sleeve 5, adapted to telescope to a greater or less extent within said neck. This sleeve is adjusted vertically in any suitable way, but preferably by means of a lever 6, pivoted at 7 and extending through an opening 8, formed in the section 1. On its inner end the lever 6 is provided with forked arms 9, having slotted ends 10, which engage with trunnions 11, formed on the regulating-sleeve 5. The trunnions 11 work in slots 12 in the neck 4 and by means of which the vertical movements of the sleeve 5 will be guided. The lever 6 is provided at its end with a handle 13 and with a clamping-screw 14, adapted to clamp the lever at any desired point on the quadrant 15, cast with the section 1.

The upper portion of the section 2 is formed to constitute an essentially circular flat stationary table 16, located below the neck 4 and regulating-sleeve 5. Concentric with this stationary table is a channel 17 of a gradually-increasing depth, as shown, said channel communicating at its deepest portion with the exit-opening 18. It will be observed that any material swept from the table 16 will fall into the channel 17 and will flow down the same to the exit-opening 18. The section 2 of the feed-chamber is formed with a bearing 19, in which is mounted a vertical shaft 20. This shaft is operated in any suitable way. Keyed to the shaft 20 within the feed-chamber is a deflecting-cone 21, having one or more radial cast arms 22. Each of these arms carries a shear 23, arranged at an angle to the diameter of the table and slightly curved, as shown. The outer ends of the shear or shears overlap the stationary table 16, as will be understood. Preferably, also, the shear or each of the shears is at its outer end curved slightly out of the vertical, whereby when the shear or shears are moved over the surface of the table 16 by the rotation of the shaft 20 the material will be swept off of the table in line with the shears and deposited in the channel 17. Preferably the shaft 20 above the deflecting-cone 21 carries a sleeve 24, having agitating-arms 25, cast integrally therewith and located in the regulating-sleeve 5 to agitate the material therein and prevent its formation into clots or aggregates tending to clog the device and prevent a uniform feed to the table 16. In order to prevent material from working under the deflecting-cone 21 and injuring the bearing 19, I preferably form the table 16 with an annular ridge 26 surrounding the shaft and working in a recess 27 in said deflecting-cone.

The operation of my improved feed device will be as follows: Material being supplied to the neck 4 falls by its weight through the regulating-sleeve 5 onto the deflecting-cone 21 and is spread out upon the table 16. The shaft 20 being rotated, the shear or shears will be carried with respect to the table 16 and will sweep off the material which accumulates on said table. This material being deposited in the channel 17 will be carried by reason of the incline over to the discharge-opening 18. Preferably the section 1 is provided with an opening 28 therein sufficiently large to admit the arm of the operator to clean out the device in case it becomes choked.

It will be observed that by adjusting the distance between the lower end of the regulating-sleeve and the table 16 by operating the handle 6 the thickness of material which will be deposited on said table will be varied, and in consequence the quantity of material swept off of the table by the operation of the shear or shears can be adjusted to any desired extent.

Having now described my invention, what I claim as new, and desire to secure by Letters Patent, is as follows:

1. In a feeding device, the combination of a feed-chamber, a flat stationary table therein, a channel concentric with said table but of increasing depth, and a shear rotatable with respect to the table for removing material therefrom by a scraping action, substantially as set forth.

2. In a feeding device, the combination of a feed-chamber, a flat stationary table mounted in said chamber, a concentric channel of increasing depth surrounding said table, a shear movable with respect to said table for removing material therefrom, a neck in the casing through which material is introduced, a vertically-adjustable regulating-sleeve in said neck, a deflecting-cone rotatable with said shear, and means for removing material from said table, substantially as set forth.

3. In a feeding device, the combination of a feed-chamber, a flat stationary table mounted in said chamber, a concentric channel of increasing depth surrounding said table, a shear movable with respect to said table for removing material therefrom, a neck in the casing through which material is introduced, a vertically-adjustable regulating-sleeve in said neck, a deflecting-cone rotatable with said shear, and a series of agitating-arms for agitating the material within said regulating-sleeve, substantially as set forth.

4. In a feeding device, the combination of a feed-chamber, a flat stationary table mounted in said chamber, a shaft passing vertically through said table, a cone carried on the end of said shaft and rotating immediately above the table, a plurality of curved shears carried by the cone and rotated by the shaft immediately over the table, so as to remove material therefrom by a scraping action, a neck in the casing through which material is introduced, movable toward and away from the table and within the shears, and means for adjusting the said neck, substantially as set forth.

5. In a feeding device, the combination of a feed-chamber, a flat stationary table mounted in said chamber, a shaft passing vertically through said table, a cone carried on the end of said shaft and rotating immediately above the table, a plurality of curved shears carried by the cone and rotated by the shaft immediately over the table, so as to remove material therefrom by a scraping action, a neck in the casing through which material is introduced, a vertically-adjustable regulating-sleeve in said neck, movable toward and away from the table and within the shears, and means for adjusting the said neck, the feed-chamber being provided with an opening therein for the admission of air, substantially as set forth.

This specification signed and witnessed this 3d day of December, 1898.

WILLIAM MAXWELL WHEILDON.

Witnesses:
   HELEN P. NELSON,
   ALBERT E. LITTLE.